United States Patent
Sharifi et al.

(10) Patent No.: US 11,544,119 B2
(45) Date of Patent: Jan. 3, 2023

(54) BUSINESS RULES PROCESSING FRAMEWORK FOR IMPLEMENTING NEW DESIRED FUNCTIONALITY IN A TELECOMMUNICATION APPLICATION

(71) Applicant: BCE INC., Verdun (CA)

(72) Inventors: Haki Sharifi, Mississauga (CA); Ivan Alfredo Padron, Mississauga (CA); Bob N. Rogers, Toronto (CA); JunSang Kwon, Oakville (CA)

(73) Assignee: BCE Inc., Verdun (CA)

( * ) Notice: Subject to any disclaimer, the term of this patent is extended or adjusted under 35 U.S.C. 154(b) by 592 days.

(21) Appl. No.: 16/722,516

(22) Filed: Dec. 20, 2019

(65) Prior Publication Data
US 2020/0211027 A1    Jul. 2, 2020

Related U.S. Application Data

(60) Provisional application No. 62/785,324, filed on Dec. 27, 2018.

(51) Int. Cl.
*G06F 9/54* (2006.01)
*G06F 11/34* (2006.01)

(52) U.S. Cl.
CPC .......... *G06F 9/541* (2013.01); *G06F 11/3476* (2013.01)

(58) Field of Classification Search
None
See application file for complete search history.

(56) References Cited

U.S. PATENT DOCUMENTS

| | | | |
|---|---|---|---|
| 2003/0018555 A1* | 1/2003 | Callan | G06Q 40/04 705/35 |
| 2003/0158759 A1* | 8/2003 | Kannenberg | G06F 8/70 705/4 |
| 2008/0133263 A1* | 6/2008 | Callan | G06Q 40/00 705/37 |
| 2010/0100468 A1* | 4/2010 | Spector | G06Q 20/405 705/35 |
| 2015/0142501 A1* | 5/2015 | Nair | G06Q 10/06316 705/7.26 |
| 2015/0293834 A1* | 10/2015 | Potdar | G06Q 10/0639 717/131 |

* cited by examiner

*Primary Examiner* — Qing Chen (57) ABSTRACT

A framework for developing telecommunication applications is described. The framework comprises a number of interacting micro services. The micro service architecture of the invention is used to provide an efficient framework comprised of a set of functionalities that allows for the implementation of business logic for real-time transactions processing. The framework allows features or applications to be implemented using configuration or business rules, rather than a developer having to take the desired new functionality and add to a monolithic application using traditional methods.

22 Claims, 5 Drawing Sheets

BUSINESS RULES PROCESSING FRAMEWORK FOR IMPLEMENTING NEW DESIRED FUNCTIONALITY IN A TELECOMMUNICATION APPLICATION

RELATED APPLICATIONS

This application claims priority to U.S. Provisional Patent Application No. 62/78,324, filed Dec. 21, 2018, the contents of which are incorporated by reference herein in their entirety for all purposes.

TECHNICAL FIELD

The current application relates to processing systems in telecommunication networks and, in particular, to an efficient framework for developing new applications.

BACKGROUND

Managing telecommunication networks and associated devices may require adding, blocking, removing or modifying different features available to devices. As new applications or features are deployed it may be necessary to develop or update software for handling the new features. The software development lifecycle can be a time consuming process and, as such there can often be a relatively long delay between when the software is requested and when it is actually available to use (e.g. in a production environment).

An additional, alternative and/or improved method for implementing new features and or functionality is desirable.

BRIEF DESCRIPTION OF THE DRAWINGS

Features, aspects and advantages of the present disclosure will become better understood with regard to the following description and accompanying drawings in which.

DETAILED DESCRIPTION

In accordance with the present disclosure there is provided a framework for implementing desired functionality: orchestrator micro-service functionality comprising: adapter connection functionality comprising one or more adapter connectors each for: receiving at an orchestrator micro service event data associated with a network event; and generating at the orchestrator micro service a transaction object corresponding to the event data and including a rule set identifier; and transaction orchestration functionality for: transmitting from the orchestrator micro service the generated transaction object to a rules processing micro service; receiving at the orchestrator micro service a processed transaction object from the rules processing micro service, the processed transaction object including one or more actions generated by the rules processing micro service; transmitting from the orchestrator micro service the received processed transaction object to an action execution micro service; and receiving at the orchestrator micro service a results transaction object from the action execution micro service, the results transaction object including results of the action execution micro service performing the actions in the transmitted processed transaction object.

In a further embodiment of the framework, the transaction orchestration functionality is further for: tracking a processing status of the transaction object.

In a further embodiment of the framework, tracking the processing status of the transaction object comprises: receiving an indication of the success or failure of processing the transaction object from the rules execution micro service; and retransmitting the transaction object to the rules execution micro service when the indication is of a failure.

In a further embodiment of the framework, additional adapters can be added to orchestrator micro service.

In a further embodiment of the framework, the rules execution micro service comprises: one or more business rule sets each comprising a respective rule set identifier and one or more rules and associated action.

In a further embodiment of the framework, the rules execution micro service comprises one or more agents for retrieving information from external sources.

In a further embodiment of the framework, the one or more rules specify one or more variables to be retrieved in evaluating the one or more rules.

In a further embodiment of the framework, the variables indicate a source of the variable to be retrieved.

In a further embodiment of the framework, the sources comprise at least one of the transaction object and an agent of the one or more agents.

In a further embodiment of the framework, the actions execution micro-service comprises: one or more client adapters for connecting to respective functionality and performing an associated action.

In a further embodiment of the framework, the actions execution micro service returns results of performing the actions to the orchestrator micro service.

In accordance with the present disclosure there is further provided a method for use in implementing desired functionality, the method comprising: receiving at an orchestrator micro service event data associated with a network event; generating at the orchestrator micro service a transaction object corresponding to the event data and including a rule set identifier; transmitting from the orchestrator micro service the generated transaction object to a rules processing micro service; receiving at the orchestrator micro service a processed transaction object from the rules processing micro service, the processed transaction object including one or more actions generated by the rules processing micro service; transmitting from the orchestrator micro service the received processed transaction object to an action execution micro service; and receiving at the orchestrator micro service a results transaction object from the action execution micro service, the results transaction object including results of the action execution micro service performing the actions in the transmitted processed transaction object.

In a further embodiment, the method further comprises: tracking a processing status of the transaction object.

In a further embodiment of the method, tracking the processing status of the transaction object comprises: receiving an indication of the success or failure of processing the transaction object from the rules execution micro service; and retransmitting the transaction object to the rules execution micro service when the indication is of a failure.

In a further embodiment, the method further comprises adding additional adapters to orchestrator micro service.

In a further embodiment of the method, the rules execution micro service comprises: one or more business rule sets each comprising a respective rule set identifier and one or more rules and associated action.

In a further embodiment of the method, the rules execution micro service comprises one or more agents for retrieving information from external sources.

In a further embodiment of the method, the one or more rules specify one or more variables to be retrieved in evaluating the one or more rules.

In a further embodiment of the method, the variables indicate a source of the variable to be retrieved.

In a further embodiment of the method, the sources comprise at least one of the transaction object and an agent of the one or more agents.

In a further embodiment of the method, the actions execution micro-service comprises: one or more client adapters for connecting to respective functionality and performing an associated action.

In a further embodiment, the method further comprises returning results of performing the actions to the orchestrator micro service.

Software may typically be provided as a monolithic application. However, monolithic software design can make scaling an application difficult or inefficient. Micro services can be used to break monolithic software applications into individual services for providing different functionality. The micro services can then be scaled individually and as such only those portions of software needing additional resources (computing, processing, networking, etc.) need to have more micro services added. The micro service architecture provides different instances of the micro services necessary to meet the capacity needs rather than duplicating the entire monolithic application as is done with monolithic architectures. The micro service architecture of the invention is used to provide an efficient framework comprised of a set of functionalities that allows for the implementation of business logic for real-time transactions processing. The framework allows features or applications to be implemented using configuration or business rules, rather than a developer having to take the desired new functionality and add to a monolithic application using traditional methods. The framework allows the features to be implemented on standalone micro services without the need to compile developer code. In an example embodiment, the rules can be provided as text based rules written in a domain specific language (DSL). Additional features can be implemented as plugins. The framework allows faster development of software for provisioning and managing user accounts in telecommunications.

Although applicable in other areas the current framework is described with regard to its use in provisioning and managing user accounts in telecommunications. When provisioning and managing user accounts new functionality may be desirable to simplify the work required. For example, if a new feature is launched that allows users to share data across a number of subscriber accounts, new software functionality may be deployed that allows a customer service representative to enable the feature on desired accounts. Previously, each change in business logic would require new source code to be written and ingested into the software development pipeline as part of the monolithic application. Hence, the code would have to be recompiled for each configuration change which is not efficient. Instead of building new application software to implement configuration changes or new business rules, a domain specific language (DSL) can be used to write business rules defining the desired functionality to be added, which can be uploaded into the framework of the system. The framework of the invention enables a business rules as a service type architecture.

Figure 1:
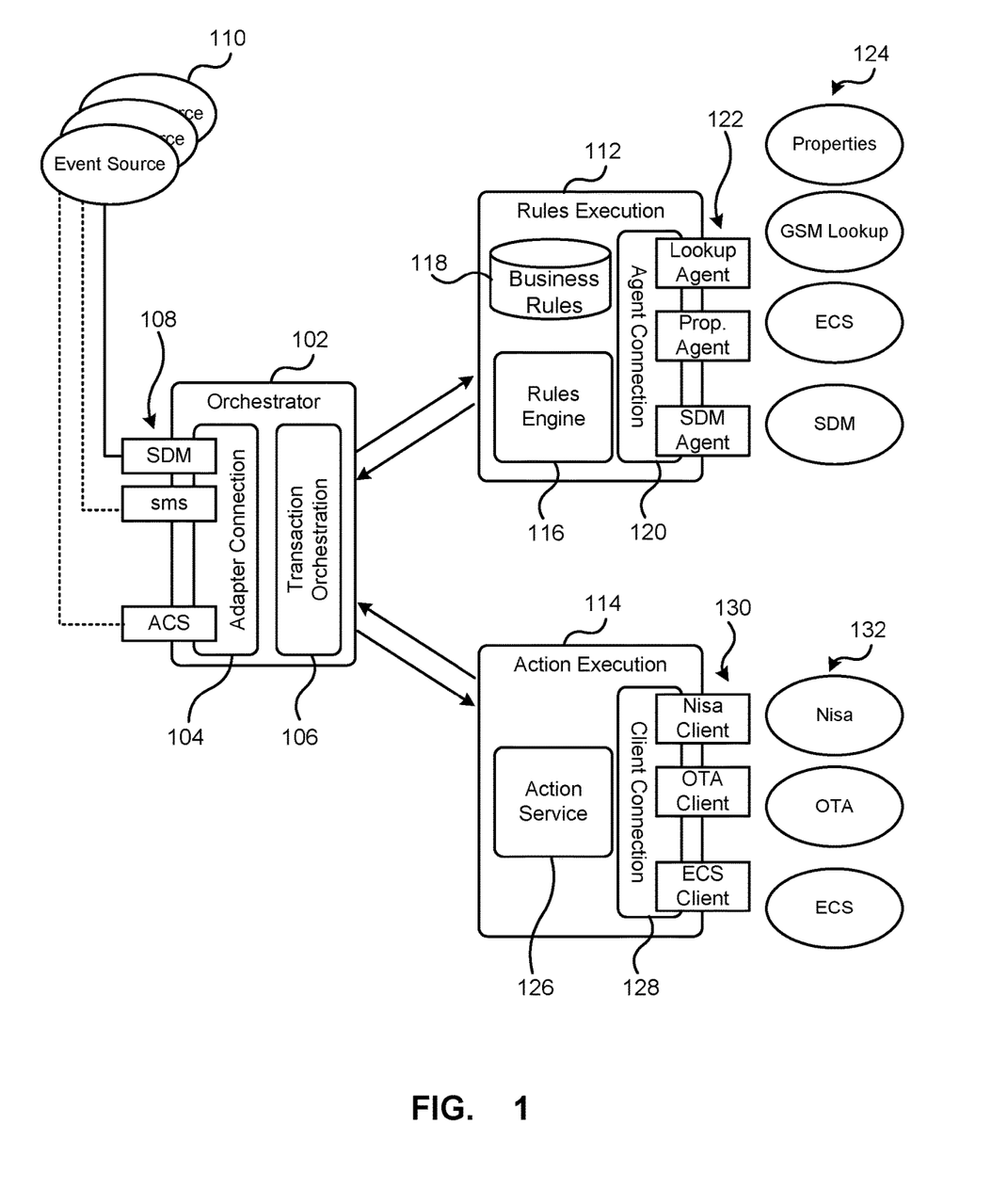
FIG. 1 depicts components of a framework for implementing business rules.

FIG. 1 depicts components of a framework for implementing business rules. The framework 100 comprises an orchestrator micro service 102. The orchestrator micro service 102 may comprise adapter connection functionality 104 and transaction orchestration functionality 106. The adapter connection functionality 104 allows one or more event or notification adaptors 108 to be added to the orchestration micro service. The adaptors 108 are associated with respective event (or trigger) sources 110 and receive messages or notifications from the sources and generate corresponding transaction objects from the received messages. For example, an SDM (subscriber data management) adapter may receive messages from an SDM source, and the SDM adapter processes the message to create a transaction object including the data from the message such as user account details. New adapters can be created and added to the orchestrator as desired in order to provide new capabilities to interact with new sources such as an SMS adapter that may receive messages from a Short Messaging Service. A wide range of adapters may be developed that can receive respective message and generate a corresponding transaction object that includes the data from the message. For example an ACS adapter may receive messages from an access control system and generate corresponding transaction objects. The conversion between the event source messages and the transaction object that the adapter does can depend upon the details, including for example the protocol and data structures, of the event source, however generally the adapter parses or processes the event message to extract the relevant data from the message and formats the information into a transaction object. The adapter may also add a rule set identifier to the transaction object. As described further below the rule set identifier that is added may be used to determine what rules should be used in processing the transaction object. The rule set identifier that is added may be a predetermined or predefined identifier based on the event source, the type of message from the event source, and/or information in the received message.

When a new transaction object is generated by any of the adapters, it is provided via the adapter connection functionality 104 to the transaction orchestration functionality 106. The transaction orchestration functionality 106 is responsible for coordinating the processing of the transaction objects. The transaction orchestration functionality distributes the transaction objects to rules execution micro service(s) 112, and receives results from the rules execution micro service 112. The results received back from the rules execution micro service may be provided as a processed transaction object which may be similar to the transaction object but further includes one or more actions to be performed as determined by the rules execution micro service. The transaction orchestration functionality receives the processed transaction object and passes the actions to be performed to the actions execution micro service(s) 114. If there are a plurality of actions to be performed or attempted, the actions may be passed to the actions execution micro service(s) individually or in groups. Further, the transaction orchestration micro service may pass the processed transaction object, which includes the actions, to the action execution micro service.

The transaction orchestration functionality 106 may track transaction objects, including processed transaction objects received from the rules execution micro service, provided to the rules execution micro service and action execution micro services and can ensure that transaction objects are properly processed, such as by coordinating process flows. For example, if a transaction object is passed to the rules execution micro service and no response is received after a timeout period of time, the transaction orchestration functionality 106 can pass the transaction object to the rules execution micro service again. Similarly, if the actions are not completed, the transaction orchestration functionality 106 may pass one or more of the actions, possibly in the form of the processed transaction object, to the actions execution micro service for attempting again.

The rules execution micro service 112 comprises a rules engine 116 that receives a transaction object and retrieves one or more rule sets for processing that transaction object. The transaction object may include a rule set identifier that is added by the adapter when generating the transaction object. One or more rule sets can be associated with the rule set identifier and the rules engine 116 may retrieve the associated rule sets from a business rules store 118. The business rules of the rule sets may be specified or defined in a number of different ways, including for example as one or more tables, defining rules and conditions, actions, and associations between rules and actions. Additionally or alternatively, the rule sets may be specified in a domain specific language (DSL) that allows the processing of business rules to be defined. A rule set specifies the business rules as one or more conditions to be checked. The conditions may include information that can be queried or retrieved from the agents for one or more data sources as well as the transaction object. The rules engine 116 may retrieve data or information through agent connection functionality 120 that provides a connection between the rules engine 116 and one or more agents 122. Each of the agents 122 may retrieve information from different data sources 124 and provide the retrieved information to the rules engine 116. For example, the data sources may allow for properties to be looked up, additional device information to be retrieved etc. The agents may access any type of data source and convert the information into a format that can be used by the rules engine.

The rule sets define one or more rules with conditions and associated action, which if the rule or condition is satisfied, is to be applied or run. The rules or conditions may include or process information included in the transaction object as well as information from the data sources 124. The rules engine 116 retrieves the appropriate rule set for the transaction object and evaluates the rules and conditions specified by the rule set to determine the actions to be taken or performed. The rules engine 116 may retrieve data required to evaluate the conditions using one or more agents.

The following is an example of a simplified rule set which for the sake of simplicity determines if a user is old enough to drive. A more complex rule set is provided further below.

```
scope: TestScope
vars:
    isOld: " new Integer(%age) > 16 "
rules:
    -name: "example"
    if:
        condition: %isOld
        status: "ok-old"
        action: "@email.execute("sendEmail",
```

-continued

```
            "email ok age")
    else:
        status: "Warn-too-young"
        action: "@email.execute("sendEmail",
"email young")
```

From the example rule set, the rule set identifier is 'TestScope'. Accordingly, when a transaction object that includes the 'TestScope' identifier is received at the rules execution micro service the rule set will be retrieved. This rule set causes the rules engine to retrieve the variable %age. The rules execution functionality may maintain a list of variables and associated agents that can provide the variable along with what information is required to retrieve the variable that can be used to determine what agent the rules engine 116 may use to retrieve the data for a variable. Once the age is retrieved, the rule determines if the age is greater than 16, and if it is the variable isOld is set to true, otherwise it is set to false. The single rule "example" checks the condition of isOld and if it is true (i.e. the user's age is >16) the status is set to "ok-old" and the action is determined to send an email indicating that the age is ok. If isOld is not true, the status is set to "Warn-too-young" and an email is sent notifying that the user is too young. It will be appreciated that the above described rule set is simplified in order to highlight the retrieval of data for variables and processing of the variables according to specified rules or conditions to provide actions.

The rules engine 116 can provide the status and actions to be taken determined from the rule set back to the orchestrator 102, which in turn can pass the actions to be performed to the action execution micro service 114. The action execution micro service 114 comprises action service functionality 126 that receives the action information from the orchestrator 102 and processes the action information to execute, or attempt to execute, the action. The action service may perform the action through a client connection functionality 128 that allows different clients 130 to be provided. The different clients 130 can perform actions for the action service 126 on different services 132. For example, the Nisa client may be able to perform actions on the Nisa system, which may be a user account management system for modifying accounts. The OTA client may be used for sending user notifications over the air, while an ECS client may allow actions to be performed in an expanse claim system.

It will be appreciated that the individual micro services of the orchestrator 102, rules execution 112 and action execution 114 can be scaled independently from the others. Accordingly, if it is necessary to for example, add more rules execution micro services to handle and or balance the load, only new instances of the rules execution engine need be started providing for efficient scaling, rather than having to duplicate an entire monolithic application on a server.

Figure 2:
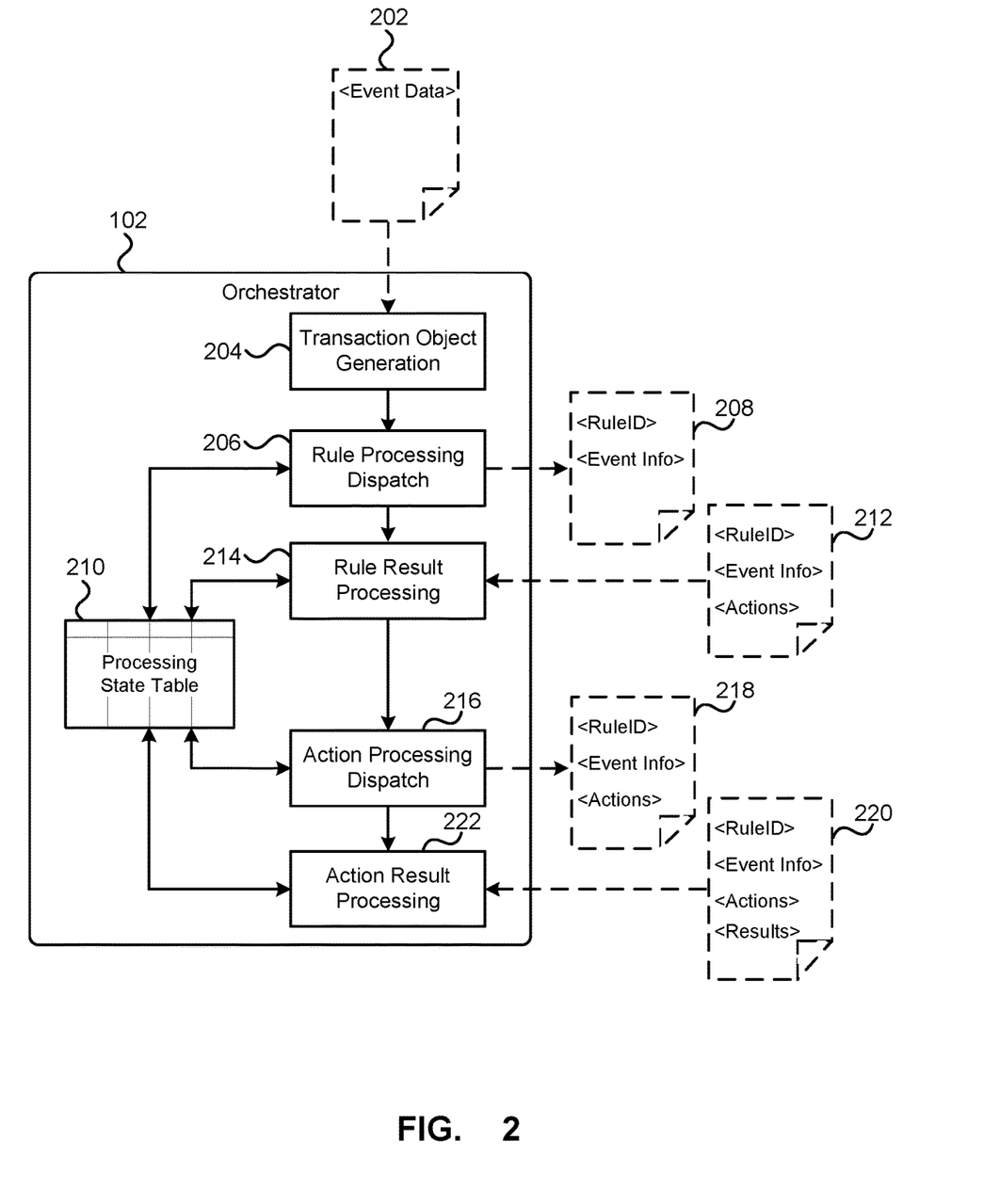
FIG. 2 depicts components of an orchestrator micro service.

FIG. 2 depicts components of an orchestrator micro service. The orchestrator micro service 102 may be implemented on one or more servers or computing devices. The server(s) or computing devices may comprise one or more processing devices such as a central processing unit, which can execute instructions in order to configure the server(s) or computing devices to provide the functionality of the orchestrator micro service. The instructions may be stored in one or more memory units that are operatively coupled to the one or more processing units.

As depicted in FIG. 2, the orchestrator micro service 102 may receive a message 202 from an event source. The message 202 may be received at an adapter that is able to process the particular message 202. The adapters may receive the message over one or more interfaces including for example wired network interfaces, wireless network interfaces, cellular communication interfaces, serial interfaces, etc. Regardless of how the message 202 is received from the event source it includes some event data. The event data have a wide range of formats or types. The adapter is responsible for receiving the message and formatting the event data, or at least a portion of the event data, into a format that the orchestrator functionality can process. The message 202 is provided to transaction object generation functionality 204, which may be part of the adapter, which parses the received message and generates a corresponding transaction object. The transaction object may include event information generated on the event data, as well as a rule set identifier, or Rule ID. As an example of the transaction object generation, the message may store a user identifier in the first two bytes of the message, which the adapter parses from the message and may generate a different representation of the user identifier according to the defined format of the transaction object. The user identifier could be stored as a text string such as "userID': 12568". It will be appreciated that other formats may be used for representing information in the transaction object, but will follow a predefined convention to allow a loose coupling between different components. For example, an adapter may specify value names followed by a semi-colon followed by the particular value. In this manner, other components of the system, such as the rules execution micro service may extract values from the transaction object that are specified in business rules.

In addition to the event information that may be generated from the event data of the message 202, the transaction object generation may also add a rule set identifier to the transaction object. The particular rule set identifier to add may be determined based on the event source, a type of the message received, a portion of the event data, or other factors. For example a message received from an SDM source may be a message type indicating that a SIM has been swapped to a new device and a rule set identifier of, for example, 'dsb' may be added. In addition to the rule set identifier and event information, the transaction object may also include an identifier in order to be able to identify the transaction object. Once the transaction object is generated it may be passed to the rules execution micro service by rule processing dispatch functionality 206. The transaction object 208, which includes both the rule set identifier, or RuleID, and the event information, is sent from the orchestrator micro service 102. In addition to transmitting the transaction object 208, the rule processing dispatch functionality 206 may also update a processing state table 210 to indicate that the particular transaction object has been transmitted to the rules execution micro service. As described further below, the rules execution micro service processes the transaction object and returns to the orchestrator actions to be performed as a result of processing the transaction object. The actions may be returned in a processed transaction object 212 which can include the received transaction object along with the determine action or actions. The processed transaction object 212, or the actions associated with the transaction object 208, may be received at rule result processing functionality 214 that receives the results and parses the results to identify the actions to be performed. Additionally, the rule result processing may identify the results of processing the transaction object, including possible indications of successful processing or failures. The rule result processing functionality may update the processing state table 210 with the processing results. The processing state table 210 may be used in order to retry processing of the transaction object. For example, if the processing state table 210 indicates that processing of a transaction object, or possibly rules associated with the transaction object, failed the rule processing dispatch may send the transaction object for processing again, possibly to the same or different rule execution micro service. Assuming that the processed transaction object 212 includes actions, they may be passed to the action processing dispatch functionality 216 which can transmit the actions, or possibly the processed transaction object including the actions, 218 to the action execution micro service. The action processing dispatch functionality 216 may update the processing state table 210 to indicate that the actions have been transmitted to the action execution micro service.

As described further below, the action execution micro service receives the actions and attempts to execute them. The results of the attempt to execute the actions may be transmitted back to the orchestrator micro service. As depicted the results may be transmitted back as a result transaction object 220, which includes the information from the processed transaction object in addition to the results of the actions. Although depicted as being sent as a result transaction object, the results of attempting the actions may be returned in other formats that allow the results to be associated with the corresponding actions. The result transaction object 220 is received at action result processing functionality 222 that can process the results to update the processing state table. Actions that were not completed successfully may be sent again, for example by the action processing dispatch functionality 216.

As described above, the orchestrator functionality may ingest event messages from various event sources. Adapters can be developed for different event sources that receive the messages and generate a transaction object from the event message. The orchestrator may coordinate the processing of the transaction objects generated by the adapters. The orchestrator may pass the transaction object to rules execution micro service, which may return a processed transaction object that includes one or more actions that should be performed. The orchestrator may pass the processed transaction object to an action execution micro service that performs the actions and returns a result of the actions in a result transaction object. Although the above describes the information of the transaction object to the rules execution micro service and the action execution micro service, it may not be necessary to transmit the complete transaction object to both micro services, however, the micro services may require information from the transaction object and as such it may be desirable to transmit the information in the transaction object to both micro services.

Figure 3:
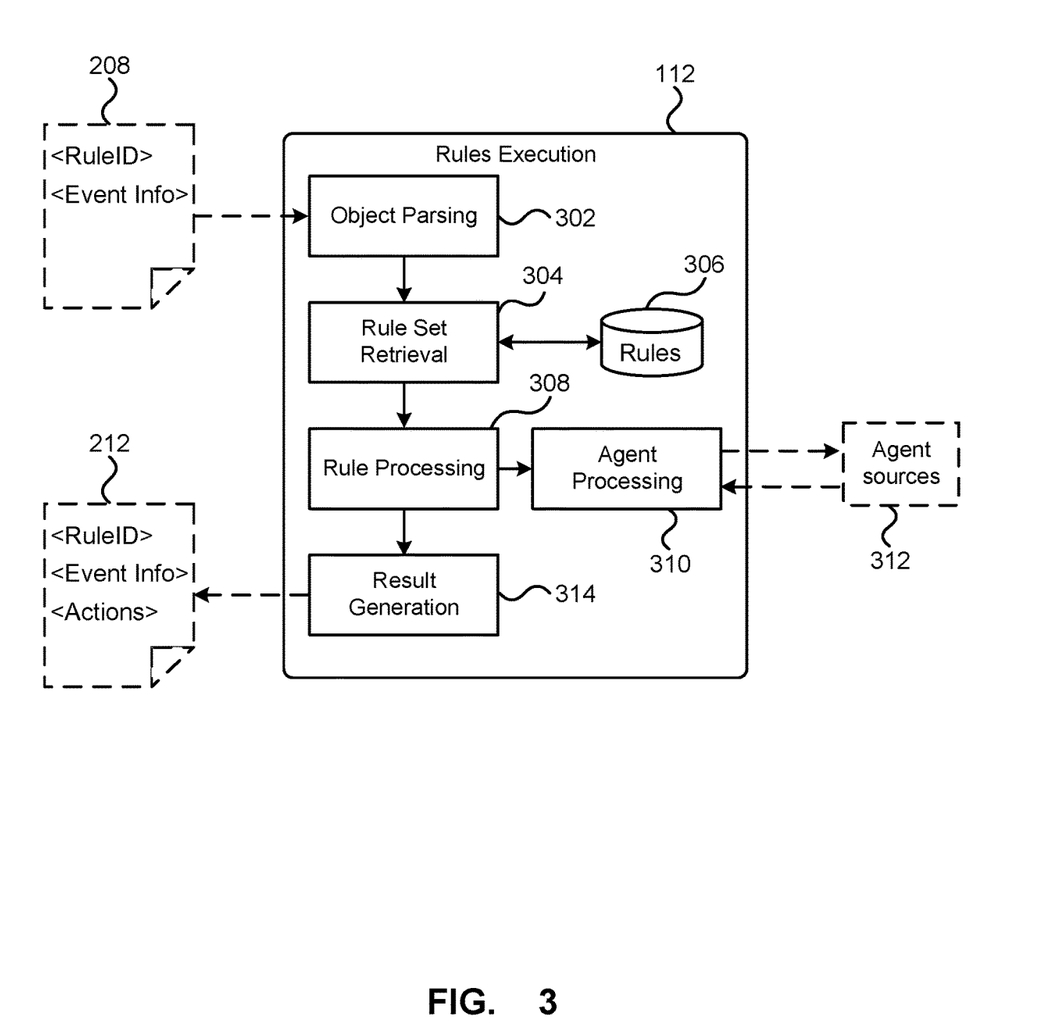
FIG. 3 depicts components of a rules execution micro service.

FIG. 3 depicts components of a rules execution micro service. The rules execution micro service 112 may be implemented on one or more servers or computing devices. The server(s) or computing devices may comprise one or more processing devices such as a central processing unit, which can execute instructions in order to configure the server(s) or computing devices to provide the functionality of the rules execution micro service. The instructions may be stored in one or more memory units that are operatively coupled to the one or more processing units.

As depicted, the rules execution micro service 112 may receive a transaction object 208 transmitted from an orchestrator process. The transaction object 208 is depicted as including a rule set identifier, or RuleID, a well as event information. The transaction object is received and parsed by object parsing functionality 302 in order to retrieve the information, i.e. the rule set identifier and event information. The rule set identifier is used by a rule set retrieval functionality 304 in order to retrieve on or more rule sets stored in a rules database 306. The rule set specifies how to process the transaction object and may be considered as a one or more conditions and associated actions if the conditions are met. The rule sets may be provided as a document or file specified in a domain specific language, which may allow non-developers or specialists to quickly specify a new rule set to provide some new desired functionality. The retrieved rule set can be provided to rule processing functionality 308 that can process the rule set as specified. The rule set may specify various information that should be retrieved in order to determine what actions to take. The information to retrieve may be from the transaction object, in which case the rule set may use a name or other identifier in the transaction object to retrieve the associated value. As described above, an adapter generates the transaction object from the event message and generates the names and associated values from the event message. The particular names used by the adapter should be the same, or follow a known format, in order to allow the rule set author to correctly identify the information to be retrieved from transaction object. In addition to retrieving information from the transaction object, information may be retrieved by one or more agents. The information to retrieve from agents may be specified in a manner, such as the use of predetermined naming convention, that allows the rule processing functionality 308 to identify the agent capable or retrieving the information. Agent processing functionality 310 may be provided by one or more agents that are provided to retrieve information from various agent sources. The agent processing functionality 310 interfaces with the particular agent source in order to retrieve the desired information. The agent processing functionality 310 may use information provided from the rules processing functionality 308 in order to retrieve the desired information. For example, an agent may interface with a subscriber data management system and may use a user identifier included in the transaction object in order to retrieve account information associated with the user identifier. The rule processing functionality retrieves the necessary information in order to process the rule set, and generates one or more actions to be performed as a result of the processing. The actions may be provided to result generation functionality 314 that generates the results for returning to the orchestrator. Although the actions may be provided to the orchestrator in various ways, as depicted, the result generation functionality may add the actions to the information from the received transaction object 208 to generate a processed transaction object 212.

Figure 4:
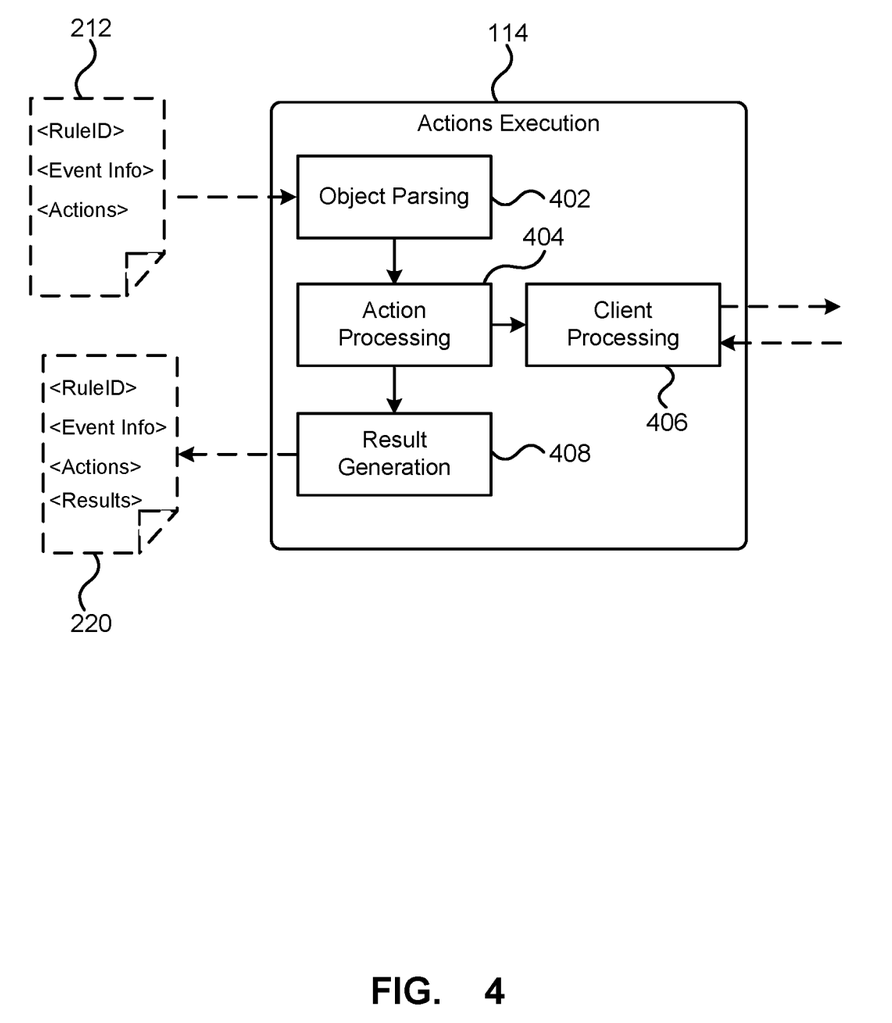
FIG. 4 depicts components of an actions execution engine.

FIG. 4 depicts components of an actions execution engine. The actions execution micro service 114 may be implemented on one or more servers or computing devices. The server(s) or computing devices may comprise one or more processing devices such as a central processing unit, which can execute instructions in order to configure the server(s) or computing devices to provide the functionality of the rules execution micro service. The instructions may be stored in one or more memory units that are operatively coupled to the one or more processing units.

The actions execution micro service 114 can receive one or more actions to be performed from the orchestrator micro service. For example, the orchestrator micro service may transmit a processed transaction object 212 to the actions execution micro service 114. The action execution micro service 114 may comprise object parsing functionality 402 that can receive the processed transaction object 212 including an indication of actions to be performed, and identifying the one or more actions, along with any information in the processed transaction object required for performing the action. For example, if an action is to add a new phone feature to a user's account, the transaction object may include an indication of the action, i.e. adding a feature, along with details such as the feature to be added as well as the user account information. The object parsing functionality 402 may pass the action, or actions, along with the extracted information, to action processing functionality 404 that attempts to perform the specified actions. The action processing functionality 404 may pass one or more actions to different client processing functionality 406 that can interface with different systems or components to perform the actions. For example, the client processing functionality 406 could interface with a subscriber data management system in order to perform an action such as updating a user's information. The client processing functionality 406 may provide results or statuses of performing, or attempting to perform, the action or actions. The results or statuses of the actions may be provided to result generation functionality 408 that can generate and return the results of the actions to the orchestrator micro service. The result generation functionality 408 may add results to the processed transaction object 212 that was received to generate a results transaction object 220.

Figure 5:
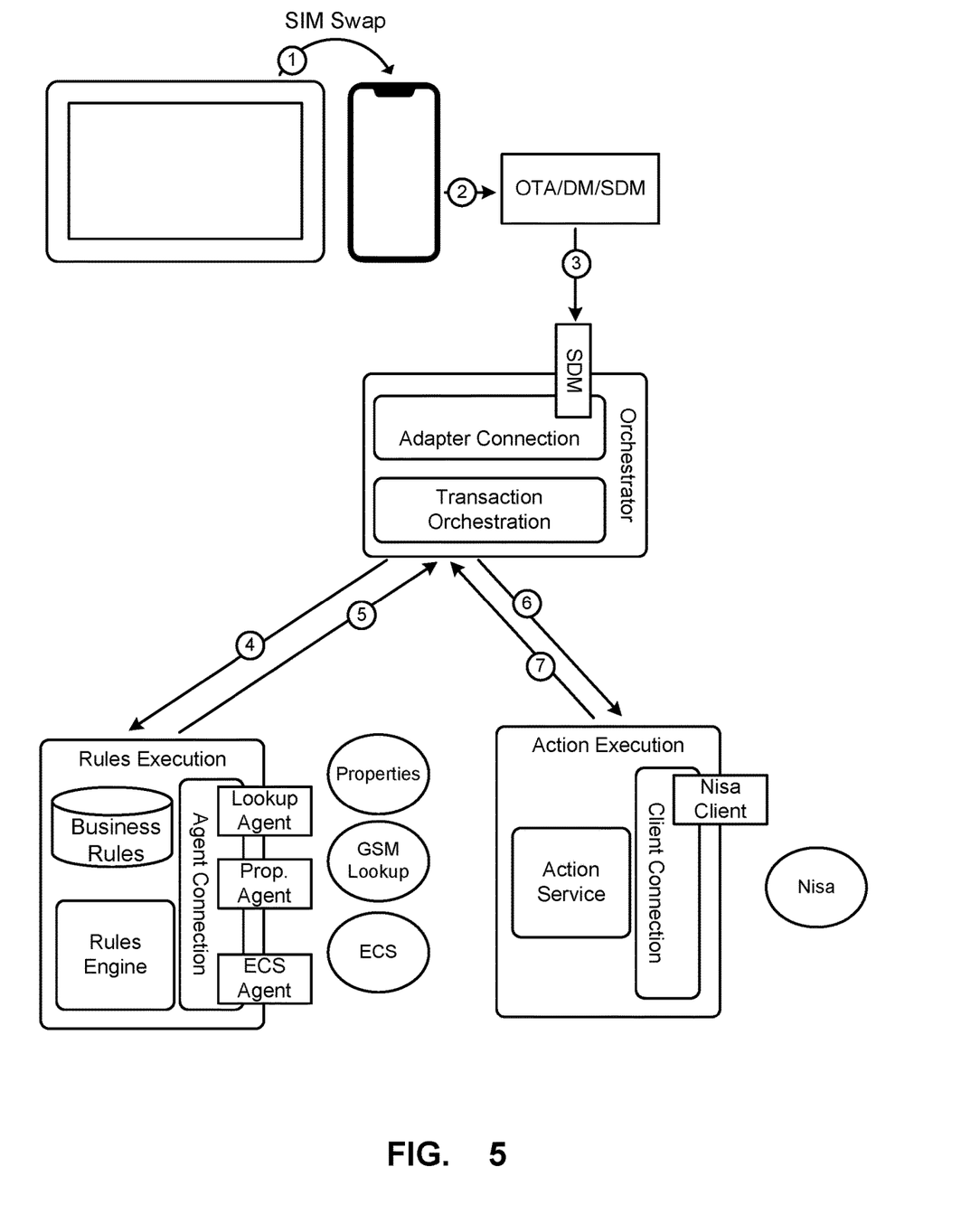
FIG. 5 depicts an application implemented using the framework of FIG. 1.

FIG. 5 depicts a process implemented using the framework of FIG. 1. The process is described as an application that detects if a user has swapped a SIM card to a new device and determines whether the data service should be blocked on the new device and if so blocks the data service for the SIM. The process begins when a user swaps a SIM card from one device to another (1), which is detected (2) by suitable functionality present in the telecom infrastructure. For example, SDM functionality may detect when a SIM is inserted in a new device. The telecom infrastructure sends (3) a notification to the SDM adapter of the orchestrator. The message is received and a transaction object generated. The transaction object includes a rule set identifier and information from the message such as the SIM information and device information. The transaction object is sent to the rules execution micro service (4) which retrieves the rule set or sets associated with the rule set identifier and processes the rules. For example, the rule set may retrieve device information and account information to determine if the SIM swap is allowed. For example, it may be allowed to swap SIM cards from one smart phone to another phone, however swapping the SIM from an internet-of-things (IoT) device to a smart phone may not be allowed. The determination of whether the swap is allowed may be based on device information, account or profile information as well as other business rules defined by the service provider. For example, a developer may be exempt from rules preventing the swapping of SIM cards. The rule set also specifies one or more actions to be performed under different conditions. For example, if the SIM swap is allowed, the action required may be to update the user's account with the details of the new device. If the SIM swap is not allowed, the action may be to block data services on the SIM card and send an email to the user notifying them of the block and the reason. Once the rule set has been processed, the determined actions are passed back to the orchestrator (5). The orchestrator may pass the actions onto the action execution micro service (6) which executes the actions and may provide a response back to the orchestrator providing status information on the performance of the actions, for example whether the actions were successfully performed or not. In the Example above, the actions may be to block the service for the SIM and notify the user of the block. An illustrative example rules set is provided below.

```
scope: dsb
name: "Dynamic Sim Block Service"
order: "6"
vars:
   processMdnListEnabled: true
   skipBanIdEnabled: true
   processMdnList:         "{'613-555-5555'}"
   skipBanIdList:          "{'613-555-5525'}"
   trackingFc:             "LOCKDY"     # only process subscribers who what have this FC
   overrideFC:             "'DSLOVR'"   # ignore subscriber because of the override
   blockFC1: "DDBLDY"                   # fc that shows up in SDM once blocking soc 1 added
   blockFc2: "DDBLD2"                   # fc that shows up in SDM once blocking soc 2 added
   blockingsoc1:           "SWDSBLK"    # soc that is added/removed to block/unblock the customer
   blockingsoc2:           "DSBDBLK2"   # customer care adds this, but DSB can remove it
   gsmafields:             "'Primary_Hardware_Type, GSMA:_Manufacturer, GsMA:_Marketing_Name"
##################################################################
# Eligibility rules
##################################################################
rules
  -name: isProcessMdnListEnabled
    if
      condition: "%processMdnListEnabled"
      vars:
        isMdnInTheProcessList: "%processMdnList.contains(%mdn)"
    else:
      vars:
        isMdnInTheProcessList: true
  -name: exitIfMdnNotInTheProcessList
    if
      condition: "MisMdnInTheProcessList"
      vars:
        statusDescription: "'203.skipping_as_mdn_is_not__the_Process_List'"
      status: OK
      exit: true
  -name: isskipBanIdEnabled
    if:
      condition: "%skipBanIdEnabled"
      vars:
        isBanIdInTheskipList: "%skipBanIdList.contains(%banid)"
    else:
      vars:
        isBanIdInTheskipList: false
  -name: exitIfBandIdInTheSkipList
    if:
      condition: "%isBanIdInTheskipList"
      vars:
        statusDescription: "1204.Skipping_as_BanId_is_on_the_skip_list"
      status: OK
      exit: true
    else:
      vars:
        hasTrackingFc: "%featurecodes.contains(%trackingFc)"
        hasoverrideFc: "%featurecodes.contains(%overrideFc)"
##################################################################
# Business Rules
##################################################################
  -name: evaluateTrackingFc
    if:
      condition: "!%hasTrackingFc"
      vars:
        statusDescription:
          "'205.skipping_as_subscriber_does_not_have_tracking_soc'
      status: OK
      exit: true
  -name: evaluateOverrideFc
    if:
      condition: "%hasoverrideFc"
      vars:
        statusDescription: "1206.skipping_as_subscriber_has_override_Soc"
      status: OK
      exit: true
```

```
        else:
            vars:
                gsmaAttributes: "@GsmA.get(igetAttributes' , %imei, %gsmafields)"
-name: iscallToGsmasuccessful
  if
      condition: "%gsmaAttributes.issuccess( )"
      vars:
          phoneType: "%gsmaAttributes.get('Primary_Hardware_Type')"
          isioiDevice: "!%phoneType.matches('mobile Phone.*1Tablet')"
          hasBlockingFc1: "%featurecodes.contains(%blockFC1)"
          hasBlockingFc2: "%featurecodes.contains(%blockFc2)"
      else:
          vars:
              statusDescription:"400.Skipping_as_call_to_GSMA_service_was_not_succes
              sful"
              status: FAILED
              exit: true
-name: addsoc1ToBlocksubscriber
  if:
      conditions:
          isNotioTDevice: "MisioTiDevice"
          doesNotHaveBlockingFc1: "!%hasBlockingFcl"
          doesNoteHaveBlockingFc2: "MhasBlockingFc2"
      actions:
          -name: "addsocToBlocksubscriber"
              execute: "@NisA.execute('addsoci, %mdn, %blockingsocl)"
          -name: "sendEmailifBlockingwassuccessful"
              given;
              "getAction('addsocToBlocksubscriber').getResponse( ).issuccess( )"
              execute: "@EmAIL.execute('sendEmail', 'fromAddress', 'toAddress',
                                                 'subject', 'Pass: ' + bodyForAddsocl)"
              status: OK
              vars:
                  statusDescription: "200.Added_Blocking_soc1"
          -name: "sendEmailifBlockingFailed"
              given:
              "!getAction('addsocToBlocksubscriber').getResponse( ).issuccess( )"
              execute: "@EmAIL.execute('sendEmail', 'fromAddress', 'toAddress',
                                                 'subject', 'Fail: ' + bodyForAddsoc1)"
              status: FAILED
              vars:
                  statusDescription: "401.Added_Blocking_soc1_Failed"
              exit: true
-name: removeSoc1ToUnblockSubscriber
  if:
      conditions:
          isIoTDevice: "%isIoTDevice"
          hasBlockingFcl: "%hasBlockingFcl"
      actions:
          -name: "removeSoc1ToUnblockSubscriber"
              execute: "@NISA.execute('removeSoc', %mdn, %blockingsocl)"
          -name: "sendEmailIfUnBlockingSoclWasSuccessful"
              given:
                  "getAction('removeSoclToUnblockSubscriber').getResponse( ).isSucces
                  s( )"
                  execute: "@EMAIL.execute('sendEmail', 'fromAddress', 'toAddress
                                                     'subject', 'successfully ' +
                                                     bodyForRemoveSoc1)"
              status: OK
              vars:
                  statusDescxiption: "201.Removed_Blocking_Socl"
          -name: "sendEmailIfUnBlockingSoc1Failed"
              given:
                  "!getAction('removeSoc1ToUnblockSubscriber').getResponse( ).isSucce
                  ss( )"
                  execute: "@EMAIL.execute('sendEmail', 'fromAddress', 'toAddress ,
                                                     'subject', 'Failed to ' +
                                                     bodyForRemoveSoc1)"
              status: FAILED
              vars:
                  statusDescription: "402.Removed_Blocking_Socl_Failed"
              exit: true
-name: removeSoc2ToUnblockSubscriber
  if:
      conditions:
          isIoTDevice: "%isIoTDevice"
          hasBlockingFC2: "%hasBlockingFC2"
      actions:
          -name: "removeSoc2ToUnblockSubscriber"
```

-continued

```
      execute: "@NISA.execute('removeSoc1, %mdn, %blockingSoc2')"
    -name: "sendEmailIfunBlockingsoc2wassuccessful"
      given:
        "getAction('removeSoc2ToUnblockSubscriber').getResponse( ).isSucces
        s( )"
      execute: "@EMAIL.execute('sendEmail', 'fromAddress', 'toAddress',
                                   'subject', 'successfully ' +
                                   bodyForRemoveSoc2)"
      status: OK
      vars:
        statusDescription: "1202.Removed_Blocking_Soc2"
    -name: "sendEmailIfunBlockingsoc2Failed"
      given:
        "!getAction('removeSoc2ToUnblockSubscriber').getResponse( ).isSucce
        ss( )"
      execute; "@EMAIL.execute('sendEmail', 'fromAddress', 'toAddress',
                                   'subject', 'Failed to ' +
                                   bodyForRemoveSoc2)"
      status: FAILED
      vars:
        statusDescription: "1403.Removed_Blocking_Soc2_Failed"
  exit: true
  -name: noAction
    if:
      condition: true
      status: OK
      vars:
        statusDescription: "207.No_action_to_perform"
      exit: true
aliases:
  fromAddress: "staging_ActiniimeApplication@doNotRepond.ca"
  toAddress: "bob@example.com"
  subject: "DynamicsimBlock"
  bodyForAddsoc1: "'added soc1 to Nisa for ' + %mdn + ' + %gsmaAttributes +
  ' +
                            #addsocToBlocksubscriber.getpescription( )"
  bodyForRemovesoc1: "'remove soc1 from Nisa for ' + %mdn + ' +
  %gsmaAttributes +
                       ' + #removesocliounblocksubscriber.getpescription( )"
  bodyForRemovesoc2: "'remove soc2 from Nisa for ' + %mdn + ' +
  %gsmaAttributes +
                       ' + #removesoc2Tounblocksubscriber.getclescription( )"
```

The above description has described an example application that can be implemented on the frame work. It will be apparent that new applications can be easily implemented by simply defining new business rule sets. The framework does not need for code to be recompiled or additional software to be developed and tested and as such new applications supporting new features can be provided, and rolled out in a timely manner.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope.

What is claimed is:

1. A framework for implementing new desired functionality in a telecommunication application, the framework comprising:
orchestrator micro-service functionality comprising:
adapter connection functionality comprising one or more adapter connectors for:
receiving, at an orchestrator micro service, event data associated with a network event; and
generating, at the orchestrator micro service, a transaction object corresponding to the event data associated with the network event and including a rule set identifier; and
transaction orchestration functionality for:
transmitting, from the orchestrator micro service, the generated transaction object to a rules processing micro service;
receiving, at the orchestrator micro service, a processed transaction object from the rules processing micro service, wherein the processed transaction object includes one or more actions generated by the rules processing micro service;
transmitting, from the orchestrator micro service, the received processed transaction object to an action execution micro service; and
receiving, at the orchestrator micro service, a results transaction object from the action execution micro service, wherein the results transaction object includes results of the action execution micro service performing the one or more actions in the transmitted processed transaction object.

2. The framework of claim 1, wherein the transaction orchestration functionality is further for:
tracking a processing status of the transaction object.

3. The framework of claim 2, wherein tracking the processing status of the transaction object comprises:
receiving an indication of a success or failure of processing the transaction object from a rules execution micro service; and
retransmitting the transaction object to the rules execution micro service when the indication is of a failure of processing the transaction object from the rules execution micro service.

4. The framework of claim 1, wherein additional adapters are added to the orchestrator micro service.

5. The framework of claim 3, wherein the rules execution micro service comprises:
one or more business rule sets each comprising a respective rule set identifier and one or more rules and associated action.

6. The framework of claim 5, wherein the rules execution micro service comprises one or more agents for retrieving information from external sources.

7. The framework of claim 6, wherein the one or more rules specify one or more variables to be retrieved in evaluating the one or more rules.

8. The framework of claim 7, wherein the one or more variables indicate sources of the one or more variables to be retrieved.

9. The framework of claim 8, wherein the sources of the one or more variables to be retrieved comprise at least one of the transaction object and an agent of the one or more agents.

10. The framework of claim 1, wherein the action execution micro service comprises:
one or more client adapters for connecting to respective functionality and performing an associated action.

11. The framework of claim 10, wherein the action execution micro service returns results of performing the one or more actions to the orchestrator micro service.

12. A method for implementing new desired functionality in a telecommunication application, the method comprising:
receiving, at an orchestrator micro service, event data associated with a network event;
generating, at the orchestrator micro service, a transaction object corresponding to the event data associated with the network event and including a rule set identifier;
transmitting, from the orchestrator micro service, the generated transaction object to a rules processing micro service;
receiving, at the orchestrator micro service, a processed transaction object from the rules processing micro service, wherein the processed transaction object includes one or more actions generated by the rules processing micro service;
transmitting, from the orchestrator micro service, the received processed transaction object to an action execution micro service; and
receiving, at the orchestrator micro service, a results transaction object from the action execution micro service, wherein the results transaction object includes results of the action execution micro service performing the one or more actions in the transmitted processed transaction object.

13. The method of claim 12, further comprising:
tracking a processing status of the transaction object.

14. The method of claim 13, wherein tracking the processing status of the transaction object comprises:
receiving an indication of a success or failure of processing the transaction object from a rules execution micro service; and
retransmitting the transaction object to the rules execution micro service when the indication is of a failure of processing the transaction object from the rules execution micro service.

15. The method of claim 12, further comprising adding additional adapters to the orchestrator micro service.

16. The method of claim 14, wherein the rules execution micro service comprises:
one or more business rule sets each comprising a respective rule set identifier and one or more rules and associated action.

17. The method of claim 16, wherein the rules execution micro service comprises one or more agents for retrieving information from external sources.

18. The method of claim 17, wherein the one or more rules specify one or more variables to be retrieved in evaluating the one or more rules.

19. The method of claim 18, wherein the one or more variables indicate sources of the one or more variables to be retrieved.

20. The method of claim 19, wherein the sources of the one or more variables to be retrieved comprise at least one of the transaction object and an agent of the one or more agents.

21. The method of claim 12, wherein the execution micro service comprises:

one or more client adapters for connecting to respective functionality and performing an associated action.

22. The method of claim 21, further comprising returning results of performing the one or more actions to the orchestrator micro service.

\* \* \* \* \*